UNITED STATES PATENT OFFICE 1,938,901

ARYLIDE OF HYDROXY AROMATIC ACIDS AND METHOD OF MAKING SAME

Ernest F. Grether, Midland, Mich., assignor to The Dow Chemical Company, Midland, Mich., a corporation of Michigan No Drawing. Application November 22, 1930
Serial No. 497,604

8 Claims. (Cl. 260—124)

The present invention is concerned with new dye intermediates from which can be prepared azo dyes of direct-developed type by coupling diazo components thereinto, particularly with hydroxy aromatic carboxylic acid arylides, and more particularly with 2.3-hydroxynaphthoic acid 3.4-dichloroanilide.

It is well known that azo dyes which are fast to light and washing may be produced by coupling diazo components, i. e. diazotized aromatic amines, into arylides such as Naphthol AS, the latter being the anilide of 2.3-hydroxynaphthoic acid. In a co-pending application, Serial No. 404,874, filed November 4, 1929, I have disclosed that 3.4-dichloroaniline and its substituted derivatives may be employed in the preparation of the abovesaid arylides, and have claimed therein the new and useful dyes formed by coupling diazotized or polyazotized aromatic amino compounds with such arylides. I am now claiming herein such arylides derived from 3.4-dichloroanilines and hydroxy aromatic acids by condensation or other suitable manner, the probable general formula of such intermediates being represented as,

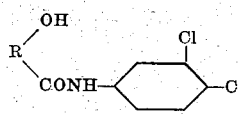

wherein the formula represents a product prepared by condensing 3.4-dichloroaniline with a hydroxy aromatic acid. My invention, then, consists of the steps and products hereinafter fully described and particularly pointed out in the claims, the following description setting forth but several of the various ways in which the principle of my invention may be used.

The herein described new arylides may be prepared from the aforementioned 3.4-dichloroanilines and hydroxy aromatic acids, e. g. 2.3-hydroxynaphthoic acid, in any of the ordinary ways, for instance by condensing the amine and acid by means of phosphorus trichloride in the presence of an aromatic hydrocarbon, e. g. toluene, as a solvent and/or diluent, or by condensing such amine with 2.3-hydroxynaphthoyl chloride.

A preferred manner in which my invention may be carried out is illustrated in the following specific examples.

Example 1

The 2.3-hydroxynaphthoic acid arylide of 3.4-dichloroaniline is prepared by condensing said acid and amine in equimolecular proportions with the aid of phosphorus trichloride in the presence of toluene at the refluxing temperature thereof in the usual manner, whereby the desired arylide forms as a solid phase intermixed with a liquid medium. The melting point of the purified arylide was found to be 255° C.

Cotton yarn is impregnated with a slightly alkaline solution of the above arylide to which may be added advantageously, but not necessarily, formaldehyde and/or other fixative, e. g. Turkey-red oil or an aluminum salt. Said yarn is then immersed in a diazo solution derived from 2-methyl-4-chloroaniline. The dye develops on the fiber and has a scarlet color, the formula being,

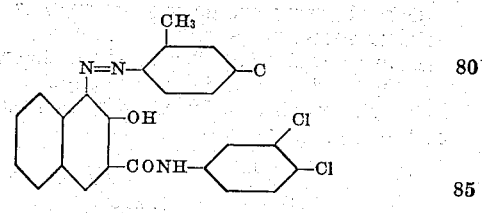

Example 2

In a manner similar to that described in Example 1, dianisidine is tetrazotized and coupled into the same arylide, the dye which develops on the fiber, being homage blue in color. The formula for the dye is,

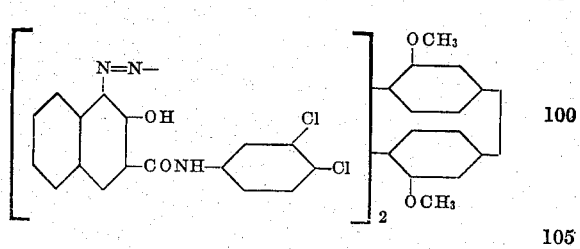

Example 3

Similarly, as described in Example 1, 2-nitro-4-ethoxyaniline is diazotized and coupled into the same arylide. The dye is dark cardinal in color, the probable formula being,

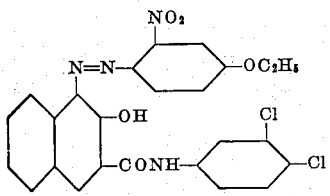

The "Standard Color Card of America" (1928 Ed.) issued by "The Textile Color Card Association of the United States, Inc." is used to designate the colors of the above dyes.

In like fashion, I have prepared other dyes of the same general type from the abovementioned arylides, by coupling thereinto other diazo components, e. g. 2-chloro-4-nitraniline, 3.4-dichloro-6-nitraniline, and aminonaphthyl-phenyl ether.

The herein described dyes prepared from my new intermediate compounds dye fibers in clear, bright, and fast shades, the color depending on the particular diazo component employed. While cotton fibers have been referred to in the example as the material to be impregnated with an alkaline solution of the herein described new arylides, other natural or synthetic fibers may likewise be treated therewith, such as silk, wool, rayon, and the like.

Furthermore, I do not limit my invention to the specifically aforementioned intermediates. Any diazo component, suitable for use in preparing azo dyes, may be employed for combining with the herein described coupling components or arylides derived from other similar amines, i. e. the bromo derivatives analogous to the specifically mentioned chloro compounds. Moreover, the several groups and residues of such arylides may be further substituted as by alkyl or halogen groups.

Other hydroxy aromatic acids, such as salicyclic acid, or substitution products thereof, e. g. halogen, nitro, and/or alkyl derivatives, likewise may be employed as arylide components.

In brief, my invention broadly involves arylides of the type,

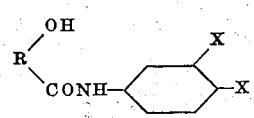

wherein R represents the residue of an aromatic hydrocarbon, X represents a bromo or chloro group, and wherein the several groups and residues may be further substituted.

Other modes of applying the principle of my invention may be employed instead of the one explained, change being made as regards the details employed, provided the steps or ingredients stated by any of the following claims or the equivalent of such be employed.

I therefore particularly point out and distinctly claim as my invention:—

1. The method of making an arylide, which comprises condensing a 3.4-dihaloaniline with a hydroxy aromatic acid.

2. The method of making an arylide, which comprises condensing 3.4-dichloroaniline with a hydroxynaphthalene carboxylic acid.

3. The method of making an arylide, which comprises condensing 3.4-dichloroaniline with a hydroxynaphthalene carboxylic acid in the presence of phosphorus trichloride and a hydrocarbon diluent.

4. The method of making an arylide, which comprises condensing 3.4-dichloroaniline with 2.3-hydroxynaphthoic acid.

5. The method of making an arylide, which comprises condensing 3.4-dichloroaniline with 2.3-hydroxynaphthoic acid in the presence of phosphorus trichloride and toluene.

6. As a new product, an arylide of the general formula,

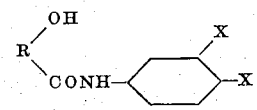

wherein R represents an aromatic residue of the benzene or naphthalene series and X represents a bromo or chloro group.

7. As a new product, an arylide of the general formula,

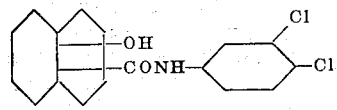

8. As a new product, 2.3-hydroxynaphthoyl-amino-3.4-dichlorobenzene, having the formula,

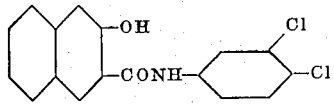

ERNEST F. GRETHER.

Certificate of Correction

Patent No. 1,938,901. December 12, 1933.

ERNEST F. GRETHER

It is hereby certified that errors appear in the printed specification of the above numbered patent requiring correction as follows: Page 1, lines 26 to 34, strike out the formula and insert instead

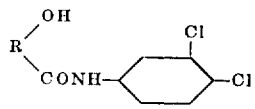

same page, lines 76 to 86, strike out the formula and insert instead

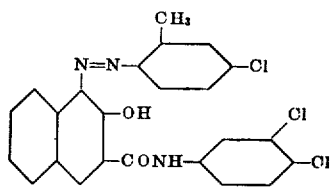

and that the said Letters Patent should be read with these corrections therein that the same may conform to the record of the case in the Patent Office.

Signed and sealed this 13th day of February, A. D. 1934.

(SEAL)

F. M. HOPKINS,
*Acting Commissioner of Patents.*